United States Patent
Leong

[11] Patent Number: 6,021,555
[45] Date of Patent: Feb. 8, 2000

[54] METHOD OF INSERTING A THREADED FASTENER INTO A FASTENING ELEMENT

[76] Inventor: Irving Leong, P.O. Box 1485, Taylors, S.C. 29687-1485

[21] Appl. No.: 09/030,097

[22] Filed: Feb. 25, 1998

[51] Int. Cl.[7] .................................................. B23Q 17/22
[52] U.S. Cl. ..................................... 29/407.03; 29/407.02
[58] Field of Search ........................... 29/407.02, 407.03, 29/714

[56] References Cited

U.S. PATENT DOCUMENTS

| | | | |
|---|---|---|---|
| 4,785,520 | 11/1988 | Bourdonne et al. | 29/407 |
| 5,014,794 | 5/1991 | Hansson | 173/12 |
| 5,105,519 | 4/1992 | Doniwa | 29/407 |
| 5,215,270 | 6/1993 | Udocon et al. | 29/407 |
| 5,216,795 | 6/1993 | Hansson | 29/407 |
| 5,502,883 | 4/1996 | Ohmi et al. | 29/407.02 |
| 5,549,169 | 8/1996 | Matsumura et al. | 173/176 |
| 5,591,919 | 1/1997 | Hathaway et al. | 73/761 |

*Primary Examiner*—David P. Bryant
*Assistant Examiner*—Essama Omgba
*Attorney, Agent, or Firm*—Michael I. Kroll

[57] ABSTRACT

A method of inserting a threaded fastener having a threaded portion into a fastening element having a threaded recess. The method includes the steps of positioning the threaded portion of the threaded fastener at an entry point of the threaded recess and rotating the threaded fastener in a counterclockwise direction causing the thread on the threaded portion to ride up the thread within the recess. The counterclockwise rotation is continued until a termination point of the thread on the threaded portion has passed a termination point of the thread within the recess, detection of such passing is determined by axial movement of the threaded fastener into the recess. At this point, the counterclockwise rotation of the threaded fastener is ceased and the threaded fastener is now rotated in a clockwise direction causing the thread on the threaded portion to ride within a groove between the rotations of the thread within the recess until a predetermined desired torque is achieved fastening the threaded fastener within the fastening element. Inserting a threaded fastener into a fastening element in this manner causes mating of the threads and eliminates any crossthreading which may occur.

1 Claim, 6 Drawing Sheets

S10 — THE STEPPER MOTOR ROTATES THE CHUCK, CONTAINING THE SCREW COUNTER CLOCKWISE FOR LESS THAN ONE UNIT OF ROTATION. THE UNIT OF ROTATION IS A DIRECT VARIABLE UPON THE RANDOM PLACEMENT BETWEEN THE END OF THE SCREW SPIRAL AND THE ENTRY POINT OF THE TAPPED HOLE'S SPIRAL.

S12 — THE THREADS OF THE SCREW RIDE UP THE THREADS OF THE TAPPED HOLE AND EXERTS AXIAL PRESSURE TOWARDS THE FASTENING DEVICE

S14 — HAS THE TERMINUS OF THE SCREW PASSED THE TERMINUS OF THE TAPPED HOLE — NO (loop back to S10) / YES

S16 — PASSING THE TERMINUS OF THE TAPPED HOLE, THE SCREW DROPS INTO THE TAPPED HOLE CAUSING THE TERMINUS OF THE SCREW THREAD SPIRAL TO PRECISELY ALIGN AND INTERLOCK WITH THE ENTRY POINT OF THE SPIRAL OF THE TAPPED HOLE.

S18 — AT THIS POINT, THE OPTIMUM CONDITIONS FOR STARTING THE RUN-IN OF A FASTENER TO A TAPPED HOLE, OR A NUT TO A BOLT, HAS BEEN ACHIEVED BY PROVIDING THE MAXIMUM EXACT ALIGNMENT TO ACHIEVE GUARANTEED SCREW STARTING.

METHOD OF INSERTING A THREADED FASTENER INTO A FASTENING ELEMENT

BACKGROUND OF THE INVENTION

1. Field of the Invention

The instant invention relates generally to methods of inserting threaded fasteners into fastening elements and, more specifically, to a method of inserting threaded fasteners into fastening elements without cross-threading.

2. Description of the Prior Art

Numerous devices for and methods of inserting threaded fasteners into fastening elements have been provided in the prior art. For example, U.S. Pat. Nos. 4,139,036; 4,354,540; 4,631,985; 4,655,103; 4,680,996; 4,766,782 and 4,878,404 are all illustrative of such prior art. While these units may be suitable for the particular purpose to which they address, they would not be as suitable for the purposes of the present invention as heretofore described.

U.S. Pat. No. 4,139,036

Inventor: Joseph R. Regan et al.

Issued: Feb. 13, 1979

A housing having top and bottom openings is provided with an interior flexible sheet containing a cross-slit for holding a screw in a vertically upright position. The bottom opening is placed over the point into which the screw is to be threaded. A screwdriver may be inserted through the top opening to engage the slot in the screw head so that the screw can be threaded. A plurality of screws can be similarly inserted into a plurality of cross-slits formed along the length of a strip in order sequentially to advance each screw into a position which is vertically aligned with the top and bottom openings. The strip may contain sprocket holes which are engaged by a sprocket mounted in a housing for advancing the strip. The strip may also be provided with detent holes for cooperation with a detent means mounted on the housing for facilitating the positioning of each screw. In addition, a spring-loaded screwdriver may be mounted in the top opening.

U.S. Pat. No. 4,354,540

Inventor: Robert T. Jefferson

Issued: Oct. 19, 1982

A screw holder system for manually positioning screws for driving provides a finger-protecting spool-shaped body with coaxial bore having closer to the bottom end than to the top a screw-centering, resilient biasing apparatus; similar bottom-plan and top-plan aspects suit the system for inverted use to hold longer screws; a bushing held by the biasing apparatus adapts the system for holding a different range of screws, with smaller head diameter; a self-leveling device is provided for use either-end-up; an axial extender provision adapts the system for use with longer screws or alternatively with greater screw driven overlap.

U.S. Pat. No. 4,631,985

Inventor: Charles G. Roberts

Issued: Dec. 30, 1986

A device for holding a screw or the like in which a body has a generally C-shaped recess adapted to grip the screw resiliently and opening into an edge of the body to enable the body subsequently to be disengaged from the screw. The C-shaped recess is provided with inwardly projecting resilient elements thereon which grip the screw or the like.

U.S. Pat. No. 4,655,103

Inventor: Wolfgang Schreiber

Issued: Apr. 7, 1987

A clutch for power screwdrivers. It has a transmission, an adjustable bit stop, and a drive shaft. It also has a cogwheel with cams on one face and a clutch disk with catches on one face mounted on the drive shaft. The object is a low-noise, wear-resistant clutch. The drive shaft is in one piece. An intermediate disk with catches on one face and cams on the other face is positioned between the cogwheel and the clutch disk. A spring mechanism is positioned between the cogwheel and the intermediate disk.

U.S. Pat. No. 4,680,996

Inventor: Peter N. Gold

Issued: Jul. 21, 1987

A screwdriver having its blade end rotated slightly about its longitudinal axis and also provided with arcuate cutouts at the rotation, so that the combination of these two structural features provides an aligning edge that remains in the observation of the user and facilitates placement of the screw-turning edge in the slot of a screw head.

U.S. Pat. No. 4,766,782

Inventor: Bernard C. Tanner

Issued: Aug. 30, 1988

The guide comprises a pair of elongated matching bars with nail or screw bores through the mating surfaces thereof. The two bars are normally maintained slightly apart to lift over the heads of nails by compression springs and include rotating cam clamps which can close the strips together against the spring pressure. One embodiment includes end clamps for engaging the opposing edges of a board and the edge of a further board to be nailed at right angles thereto so that the nail positions are correctly located. Lengthwise and width adjustments may be provided in the guide. Another embodiment permits the guide to be slipped under nail heads that have been started in order to support the nail as it is further engaged by the hammer or out from under nail heads having been both started and initially driven. The device may have guide drillings both perpendicular and at an inclined angle to the surface upon which it is engaged.

U.S. Pat. No. 4,878,404

Inventor: Hsieh-Yuan Liao

Issued: Nov. 7, 1989

An electric screwdriver includes a housing, a power output end, and a control cylinder mounting therein an active shaft connecting thereto a following shaft connecting thereto a driver mounting piece axially slidably mounted in a cap cylinder and a torsion-adjusting cylinder wherein the mounting piece has an engaging end attaching thereto a flange attaching thereon a light-shielding piece capable of shielding the light emitted by a photic control switch mounted on the control cylinder to allow the motor in the housing to be energized when the mounting piece mounts thereon a driver urging against a screw.

BRIEF SUMMARY OF THE INVENTION

The present invention is concerned with methods for inserting threaded fasteners into fastening elements and, more specifically, to a method of inserting a threaded fastener into a fastening element without cross-threading.

A primary object of the present invention is to provide a method for easily inserting a threaded fastener into a fastening element tapped with matching threads.

Another object of the present invention is to provide a method for easily starting a male threaded fastener into a female threaded element.

An additional object of the present invention is to provide a method for easily inserting a threaded fastener into a threaded element by turning the threaded fastener in a counterclockwise direction until the threads on the threaded fastener and within the threaded element are mated.

Another object of the present invention is to provide a method for automatically mating the threads of a threaded fastener and a threaded element at a point of contact therebetween.

A further object of the present invention is to provide a method for easily inserting a threaded fastener into a threaded element which eliminates all preparation of the screw tip and entry holes during manufacture.

A still further object of the present invention is to provide a method for easily inserting a threaded fastener into a threaded element which may be quickly performed irrespective of the level of skill and dexterity of the operator.

An even further object of the present invention is to provide a method for easily inserting a threaded fastener into a threaded element which can be implemented in an assembly line, providing a more efficient flow through the assembly line and eliminating the inconsistency of prior art fastening techniques.

A yet further object of the present invention is to provide a method for easily inserting a threaded fastener into a threaded element able to compensate for inconsistencies in quality control during the manufacture of the threaded fasteners.

A still further object of the present invention is to provide a method for easily inserting a threaded fastener into a threaded element able to reduce the costs associated with production of specially matched fasteners and mating elements.

An even further object of the present invention is to provide a method for easily inserting a threaded fastener into a threaded element with insignificant degradation in fastening strength upon detachment and reassembly.

A method of inserting a threaded fastener having a threaded portion into a fastening element having a threaded recess is disclosed by the present invention. The method includes the steps of positioning the threaded portion of the threaded fastener at an entry point of the threaded recess and rotating the threaded fastener in a counterclockwise direction causing the thread on the threaded portion to ride up the thread within the recess. The counterclockwise rotation is continued until a termination point of the thread on the threaded portion has passed a termination point of the thread within the recess, detection of such passing is determined by axial movement of the threaded fastener into the recess. At this point, the counterclockwise rotation of the threaded fastener is ceased and the threaded fastener is now rotated in a clockwise direction causing the thread on the threaded portion to ride within a groove between the rotations of the thread within the recess until a predetermined desired torque is achieved fastening the threaded fastener within the fastening element. Inserting of the threaded fastener into a fastening element in this manner causes a mating of the threads and eliminates any cross-threading which may occur.

The foregoing and other objects, advantages and characterizing features will become apparent from the following description of certain illustrative embodiments of the invention.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Turning now descriptively to the drawings, in which similar reference characters denote similar elements throughout the several views, the Figures illustrate a method of inserting a threaded fastener into a fastening element of the present invention. With regard to the reference numerals used, the following numbering is used throughout the various drawing figures.

10 fastening device

12 threaded fastener 14 female fastening element
16 chuck
18 first counterclockwise rotation apparatus
20 clutch
22 head of threaded fastener
24 threaded portion
26 recess
28 threads within recess
30 inner side of recess
32 groove on threaded portion
34 groove within recess
36 thread around threaded portion
38 terminating end of thread around threaded portion
40 terminating end of thread in recess
42 second clockwise rotational apparatus
44 control mechanism
46 motion sensor

DETAILED DESCRIPTION OF THE PREFERRED EMBODIMENT

A preferred embodiment of the method of inserting a threaded fastener in a female threaded element in accordance with the present invention will now be described with reference to FIGS. 1–4.

Figure 1:
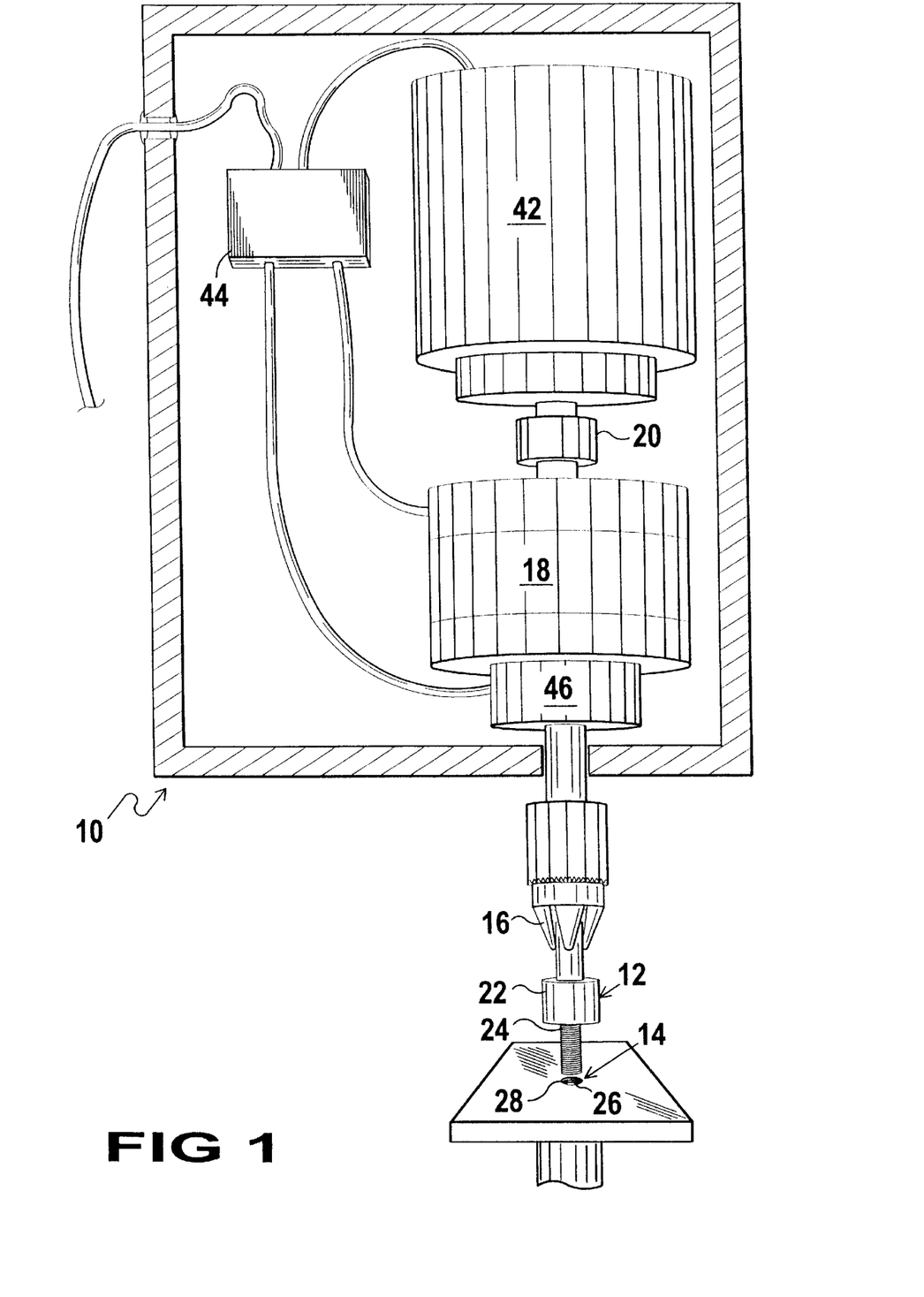
FIG. 1 is a perspective view of a threaded fastener being inserted into a fastening element using a device for turning the threaded fastener in accordance with the method of the present invention.

Specifically, FIG. 1 shows a preferred embodiment of the equipment used for performing the method of the present invention. A fastening device illustrated generally by the numeral 10 is used to hold a threaded fastener 12 such as a screw to be inserted into a female threaded element 14, e.g. a hole or nut.

The fastening device 10 which holds the threaded fastener 12 includes a chuck 16 in which the threaded fastener 12 is secured. The fastening device 10 also includes a first counterclockwise rotational apparatus 18 and a second clockwise rotational apparatus 42 for turning the chuck 16 and the threaded fastener 12 held thereby. A control mechanism 44 is connected to both the first counterclockwise rotational apparatus 18 and second clockwise rotational apparatus 42 and a motion sensor 46. A clutch 20 is positioned between the first counterclockwise rotational apparatus 18 and second clockwise rotational apparatus 42 for controlling operation thereof based upon control signals received from the control mechanism 44. The motion sensor 46 is able to detect alignment between the thread 36 on the threaded fastener 12 and the thread 28 within the threaded element 14 and signals the control mechanism 44 upon detection of such mating. The control mechanism 44 then acts to control the clutch 20.

Figures 2, 2A:
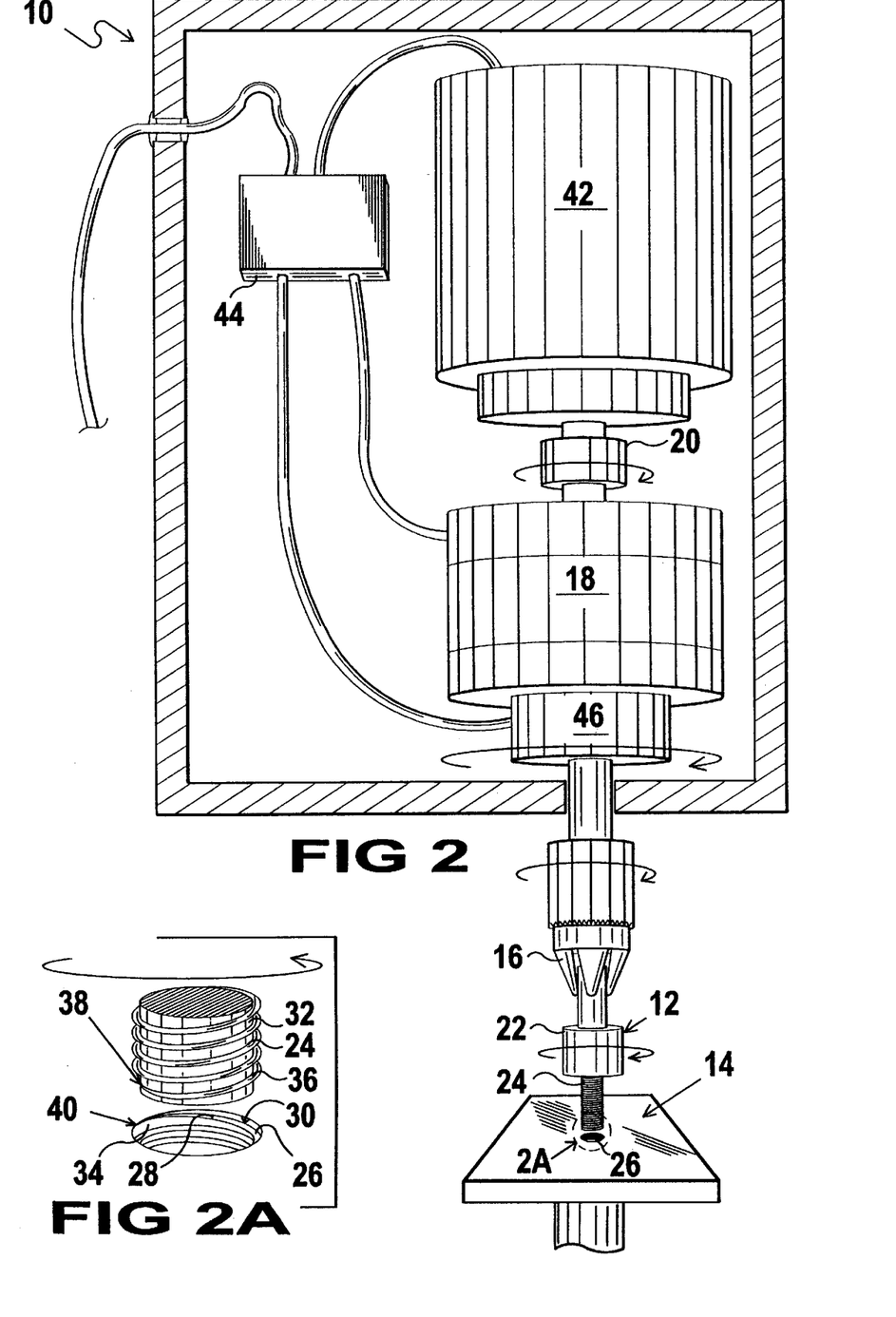
FIG. 2 is a perspective view of the threaded fastener and fastening element illustrating the direction of rotation imparted to the threaded fastener during thread alignment in accordance with the method of the present invention.
FIG. 2A is an enlarged perspective view taken within the circle labeled 2A in FIG. 2.
Figures 3, 3A:
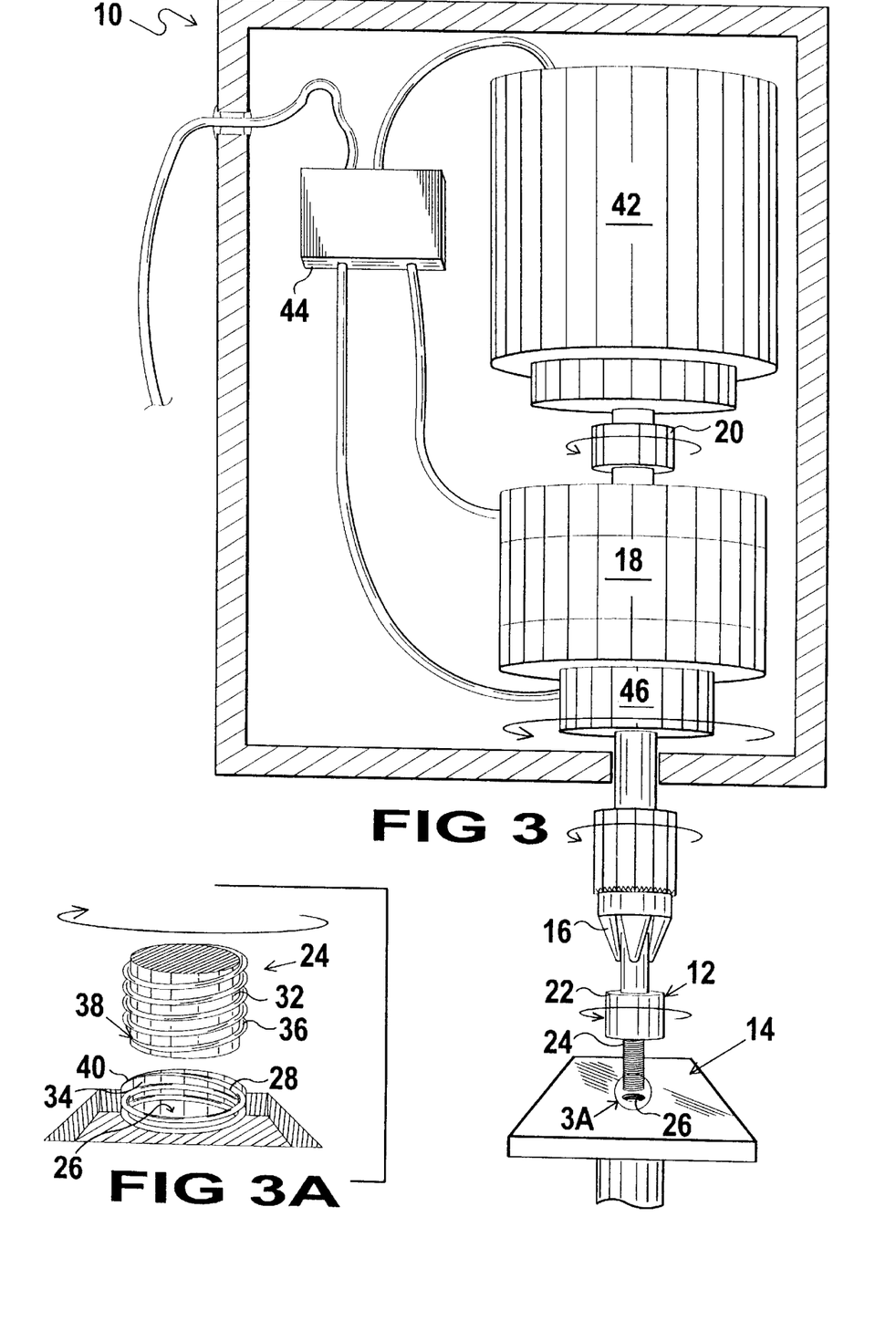
FIG. 3 is a perspective view of the threaded fastener and fastening element illustrating the direction of rotation imparted to the threaded fastener during fastening in accordance with the method of the present invention.
FIG. 3A is an enlarged perspective view taken within the circle labeled 3A in FIG. 3.

The threaded fastener 12 has a head 22 which is held by the chuck 16 and a threaded portion 24 extending therefrom. The threaded portion has a helical spiral groove 32 cut therein which form a thread 36 between each adjacent groove 32. The diameter of the threaded portion 24 is substantially equal to the diameter of a recess 26 extending into and possibly through the threaded element 14. A helical spiral groove 34 is cut into the side 30 of the recess 28 forming a thread 28 sized to mate with the thread 36 formed in the threaded portion 24. An enlarged view of the threaded portion 24 and the recess 26 are illustrated in FIGS. 2A and 3A. As can be seen from these figures, the threaded fastener 12 includes the helical spiral groove 32 cut into the threaded portion 24 while the threaded element 14 includes the helical spiral groove 34 cut into the recess 26. The groove 32 forms the ridge or thread 36 encircling the threaded portion 24 and terminating at a point 38 near an insertion end of the threaded portion 24. The groove 34 forms the ridge or thread 28 circling the side 30 of the recess 26 terminating at a point 40 near an entry point to the recess 26.

FIG. 2 illustrates the delivery to and mating or alignment mode of the threaded fastener 12 and the threaded fastening element 14. In this mode the threaded fastener 12 is rotated in a counterclockwise direction for a distance less than a full 360 degree rotation. FIG. 3 illustrates the fastening mode of the threaded fastener 12 to the threaded receiving element 14. In this mode the threaded fastener 12 is rotated in a clockwise direction until the threaded fastener 12 is secured within the fastening element 14.

While a preferred structure for the fastening device 10 is shown and described herein, those of ordinary skill in the art who have read this description will appreciate that there are numerous other structures for the fastening device 10 and, therefore, as used herein the phrase "fastening device" should be construed as including all such structures as long as they achieve the desired result of clasping and turning the threaded fastener for securing the threaded fastener to the fastening element, and therefore, that all such alternative mechanisms are to be considered as equivalent to the one described herein.

Figure 4:
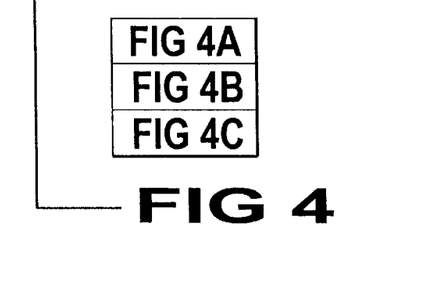
FIG. 4 is a flow chart describing the method of inserting a threaded fastener into a fastening element of the present invention.
Figure 4A:
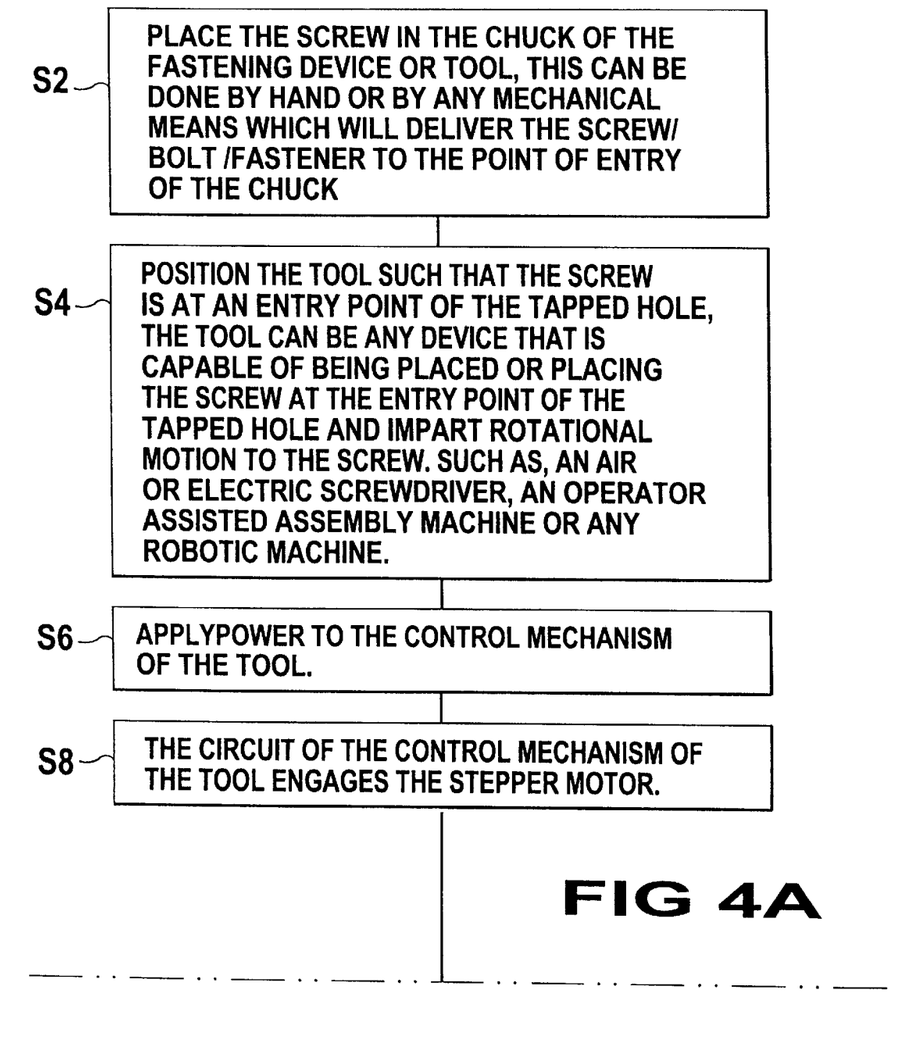
Figure 4B:
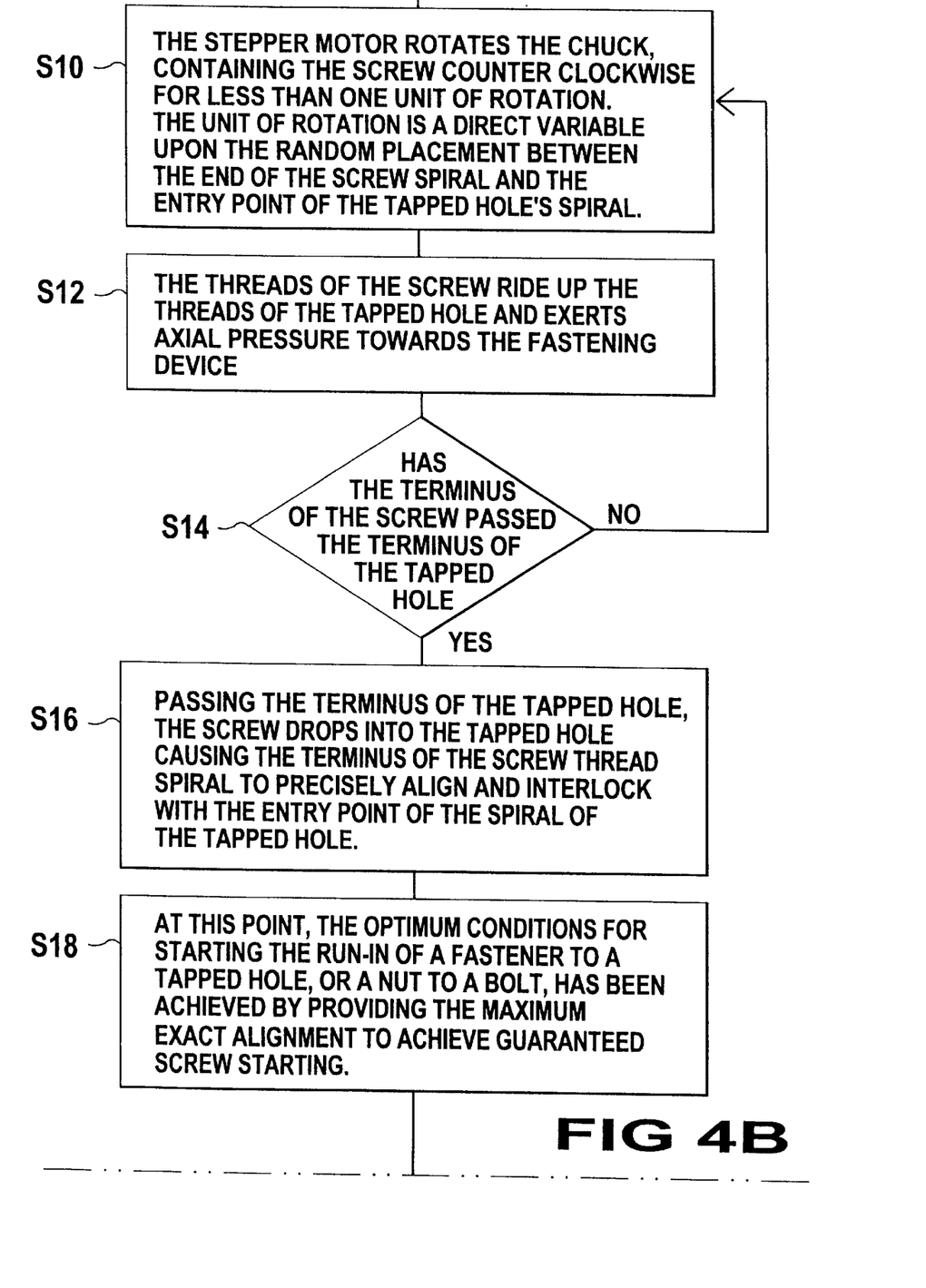
Figure 4C:
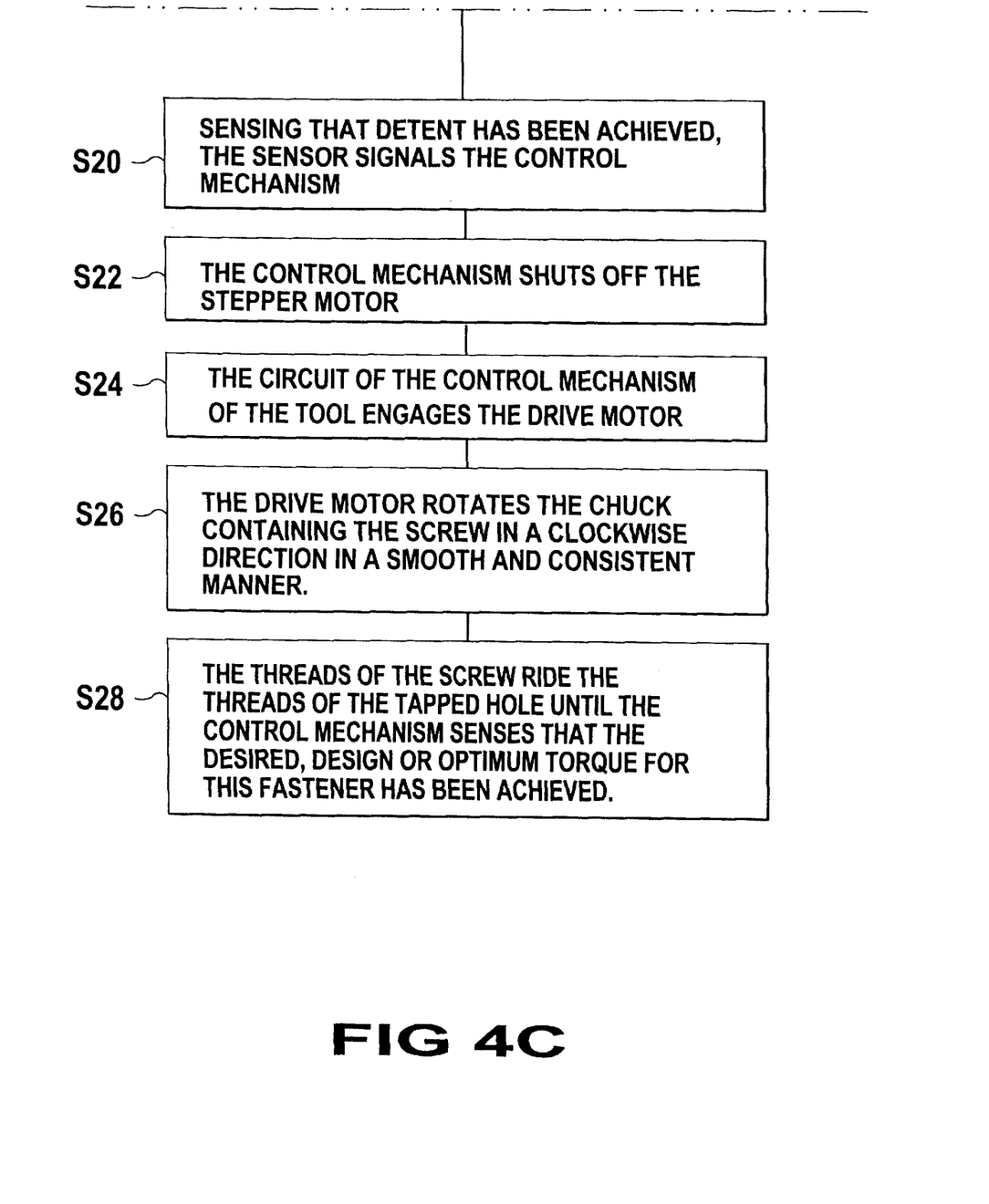

With reference to FIGS. 1–3 and the preferred embodiment of the fastening device 10 set forth therein, the method of the present invention will now be described as set forth in the flow chart of FIG. 4.

The threaded fastener or screw 12 is placed in the chuck 16 of the fastening device 10. This may be performed manually or by any other mechanical device which is able to deliver the threaded fastener 12 to the point of entry of the chuck 16 as is described by step S2. The fastening device 10 is then positioned above the recess or tapped hole 26 extending into the fastening element 14 as stated in step S4. Slight pressure is applied towards the recess 26 whereby the thread 36 around the threaded portion 24 of the threaded fastener 12 contacts the thread 28 within the recess 26. The fastening device 10 may be any device which is able to position the threaded fastener 12 at the entry point of the recess 26 and impart rotational movement to the threaded fastener 12 such as a manual, air or electric screw driver, an operator assisted assembly machine or any robotic machine.

Power is then applied to the control mechanism 44 of the fastening device 10 causing it to begin operation as stated in step S6. The power applied to the control mechanism 44 is delivered to activate the first counterclockwise rotational apparatus 18 as described in step S8. The first counterclockwise rotational apparatus 18 acts to rotate the chuck 16 and thus also rotate the threaded fastener 12 positioned therein. The chuck 16 is rotated in a counterclockwise direction for less than a 360 degree turn, as stated in step S10. The amount of rotation is directly related to the random placement between the termination point 38 of the thread 36 on the fastening element 12 and the termination point 40 of the thread 28 within the recess 26, i.e. equal to the arcuate distance between the termination point 40 of the thread 28 within the recess 26 and the termination point 38 of the thread 36 on the threaded fastener 12, when placed at the entry point of the recess 26. When turned in a counterclockwise direction, the contact between the thread 36 around the threaded portion 24 and the thread 28 within the recess 26 causes the threaded fastener 12 to ride upwards on the thread 28 of the recess exerting an axial pressure towards the fastening device 10 as described in step S12. During this counterclockwise rotation the position of the termination point 38 of the thread 36 around the threaded portion 24 of the threaded fastener 12 is continually checked to determine whether the termination point 38 of the thread 36 on the threaded portion 24 has passed the termination point 40 of the thread 28 within the recess 26 in step S14. Such is determined by detecting an axial movement of the threaded fastener 12 towards the recess 26 and indicates that the thread 36 is aligned with the thread 28. Rotation continues until such is detected.

Upon the termination point 38 of the thread 36 around the threaded fastener 12 passing the termination point 40 of the thread 28 within the recess 26, the threaded fastener 12 will drop into the recess 26 causing the thread 36 on the threaded fastener 12 to precisely align and interlock or mate with the thread 28 within the recess 26 as described in step S16. At this point, optimum conditions for securing the threaded fastener 12 within the recess 26 of the fastening element 14 are achieved, providing the maximum exact alignment of the threaded fastener 12 and the recess 26 to achieve a proper fit as described in step S18.

The motion sensor 46 determines when this point or detent is achieved in step S20 and signals the control mechanism 44. The control mechanism 44 in turn activates the clutch 20 to engage the first counterclockwise rotational apparatus 18 preventing counterclockwise rotation of the first counterclockwise rotational apparatus 18 and thereby halting the counterclockwise rotation of the chuck 16 and threaded fastener 12 as described in step S22.

The control mechanism 44 then activates the second clockwise rotational apparatus 42 causing the second clockwise rotational apparatus 42 to rotate the chuck 16 and threaded fastener 12 in a clockwise direction in a smooth and consistent manner, steps S24 and S26. The clockwise rotation of the threaded fastener 12 causes the threads 36 of the threaded fastener 12 to ride within the groove 34 and along the thread 28 within the recess 26 until the control mechanism 44 senses a desired or optimum fastening has been achieved, i.e. that the threaded fastener 12 is tightly secured within the fastening element 14 causing a particular torque to be produced during rotation, step S28.

At this point, the threaded fastener 12 is secured within the fastening element 14 without any damage to the threads on either the threaded fastener 12 or the fastening element 14. If it is desired to remove and then refasten the threaded fastener 12, the elimination of any cross-threading during the-fastening process facilitates this process and provides for a more secure fastening than would otherwise be possible refastening.

It is to be realized that this method may also be used to conversely secure a female threaded fastener, e.g. a nut, onto a male threaded element, e.g. a bolt. For purposes of this disclosure, the elements are to be considered interchangeable and the same method of attachment is to be performed.

It is thus evident that the present invention is to provide a method for easily inserting and starting a threaded fastener 12 into a fastening element 14 tapped with matching threads. This is due to the turning of the threaded fastener 12 in a counterclockwise direction until the thread 36 on the threaded fastener 12 and the thread 28 within the threaded element 14 automatically mate at a point of contact therebetween. This eliminates all need for preparation of the screw or fastener tip and entry holes or recess during manufacture and may be quickly performed irrespective of the level of skill and dexterity of the operator. Furthermore, this process can be implemented in an assembly line providing a more efficient flow through the assembly line, eliminating the inconsistency of prior art fastening techniques, compensating for inconsistencies in quality control during the manufacture of the threaded fasteners and reduce the costs associated with production of specially matched fasteners and mating elements. Insignificant degradation in the strength upon detachment and reassembly of the threaded fastener and fastening element are also realized by the method of the present invention.

It will be understood that each of the elements described above, or two or more together, may also find a useful application in other types of applications differing from the type described above.

While the invention has been illustrated and described as shown in the drawings, it is not intended to be limited to the details shown, since it will be understood that various omissions, modifications, substitutions and changes in the forms and details of the formulation illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of this invention.

What is claimed as new and desired to be protected by Letters Patent is set forth in the appended claims:

1. A method of inserting a threaded fastener including a threaded portion having a helical spiral groove cut therein to form a thread into a fastening element including recess having a helical spiral groove cut therein to form a thread, comprising the steps of:
   a) positioning the threaded portion of the threaded fastener at an entry point of the recess whereby the thread encircling the threaded portion contacts the thread within the recess;
   b) activating a first motor having a shaft to rotate the threaded fastener in a counterclockwise direction causing the thread encircling the threaded portion to ride up on the thread within the recess;
   c) sensing a position of a termination point of the thread encircling the threaded portion to determine if it has passed a termination point of the thread within the recess;
   d) deactivating said first motor, thereby ceasing counterclockwise rotation of the threaded fastener upon determining that the termination point of the threaded portion has passed the termination point of the thread within the recess causing the threaded fastener to drop into the recess and the thread encircling the threaded portion to align with the thread within the recess;
   e) activating a clutch to engage the shaft of said first motor with a shaft of a second motor and energizing said second motor to rotate the threaded fastener in a clockwise direction causing the thread encircling the threaded portion to ride within the groove cut into the recess until a desired fastening is achieved fastening the threaded fastener to the fastening element.

\* \* \* \* \*